United States Patent
Zou

(10) Patent No.: US 11,032,215 B2
(45) Date of Patent: *Jun. 8, 2021

(54) ALLOCATING VIRTUAL RESOURCE BASED ON BLOCK CHAIN

(71) Applicant: Advanced New Technologies Co., Ltd., George Town (KY)

(72) Inventor: Tao Zou, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/027,691

(22) Filed: Sep. 21, 2020

(65) Prior Publication Data

US 2021/0006506 A1 Jan. 7, 2021

Related U.S. Application Data

(63) Continuation of application No. 16/783,862, filed on Feb. 6, 2020, now Pat. No. 10,785,168, which is a (Continued)

(30) Foreign Application Priority Data

Jul. 15, 2019 (CN) .......................... 201910636312.4

(51) Int. Cl.
*G06F 15/173* (2006.01)
*H04L 12/911* (2013.01)
(Continued)

(52) U.S. Cl.
CPC .......... *H04L 47/828* (2013.01); *H04L 9/0643* (2013.01); *H04L 47/783* (2013.01); (Continued)

(58) Field of Classification Search
CPC ... H04L 47/828; H04L 9/0643; H04L 47/788; H04L 47/783; H04L 63/104; H04L 2209/38
See application file for complete search history.

(56) References Cited

U.S. PATENT DOCUMENTS

2006/0259361 A1* 11/2006 Barhydt ................. G06Q 20/06 705/14.12
2007/0226059 A1* 9/2007 Postrel ................... G06Q 20/06 705/14.33

(Continued)

FOREIGN PATENT DOCUMENTS

| CN | 108805627 | 11/2018 |
| CN | 109011583 | 12/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/072027, dated Apr. 13, 2020, 14 pages, (with partial machine translation).

*Primary Examiner* — Padma Mundur
(74) *Attorney, Agent, or Firm* — Fish & Richardson P.C.

(57) ABSTRACT

A method for allocating a virtual resource based on a blockchain, including: receiving a resource allocation transaction sent by a client, wherein the resource allocation transaction includes a user identifier of a target user; in response to the resource allocation transaction, invoking verification logic in a smart contract deployed in the blockchain to verify whether a service indicator of the target user within a preset service cycle satisfies a virtual resource allocation condition; and when the service indicator satisfies the virtual resource allocation condition, invoking virtual resource allocation logic in the smart contract to allocate a preset amount of virtual resources to the target user from a
(Continued)

virtual resource pool and transfer the preset amount of virtual resources to a blockchain account corresponding to the user identifier, wherein virtual resources in the virtual resource pool are associated with service profits of a service operator corresponding to a service of the target user.

20 Claims, 6 Drawing Sheets

Related U.S. Application Data continuation of application No. PCT/CN2020/072027, filed on Jan. 14, 2020.

(51) Int. Cl.
*H04L 9/06* (2006.01)
*H04L 29/06* (2006.01)

(52) U.S. Cl.
CPC .......... *H04L 47/788* (2013.01); *H04L 63/104* (2013.01); *H04L 2209/38* (2013.01)

(56) References Cited

U.S. PATENT DOCUMENTS

| | | | | |
|---|---|---|---|---|
| 2008/0103968 | A1* | 5/2008 | Bies | G06Q 20/06 705/39 |
| 2018/0373776 | A1 | 12/2018 | Madisetti et al. | |
| 2019/0355005 | A1* | 11/2019 | Kappagantu | G06Q 30/0215 |
| 2020/0177519 | A1 | 6/2020 | Zou | |

FOREIGN PATENT DOCUMENTS

| | | |
|---|---|---|
| CN | 109165972 | 1/2019 |
| CN | 109191289 | 1/2019 |
| CN | 109376008 | 2/2019 |
| CN | 109522330 | 3/2019 |
| CN | 109522457 | 3/2019 |
| CN | 110009498 | 7/2019 |
| CN | 110012001 | 7/2019 |
| CN | 110458702 | 11/2019 |

\* cited by examiner

ALLOCATING VIRTUAL RESOURCE BASED ON BLOCK CHAIN

CROSS-REFERENCE TO RELATED APPLICATIONS

This application is a continuation of U.S. application Ser. No. 16/783,862, filed on Feb. 6, 2020 which is a continuation of PCT Application No. PCT/CN2020/072027, filed on Jan. 14, 2020, which claims priority to Chinese Patent Application No. 201910636312.4, filed on Jul. 15, 2019 and each application is hereby incorporated by reference in its entirety.

TECHNICAL FIELD

One or more embodiments of the present disclosure relate to the technical field of blockchain, and in particular, to a method, an apparatus, and an electronic device for allocating a virtual resource based on a block chain.

BACKGROUND

Blockchain technology, also known as distributed ledger technology, is an emerging technology in which several computing devices participate in "accounting" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present disclosure provides a method for allocating a virtual resource based on a blockchain, including: receiving a resource allocation transaction sent by a client, wherein the resource allocation transaction includes a user identifier of a target user; in response to the resource allocation transaction, invoking verification logic in a smart contract deployed in the blockchain to verify whether a service indicator of the target user within a preset service cycle satisfies a virtual resource allocation condition; and if the service indicator satisfies the virtual resource allocation condition, further invoking virtual resource allocation logic in the smart contract, to allocate a preset amount of virtual resources to the target user from a virtual resource pool, and transferring the preset amount of virtual resources to a blockchain account corresponding to the user identifier, wherein virtual resources in the virtual resource pool are associated with service profits of the service operator corresponding to the service.

Optionally, the method further includes: if the service indicator does not satisfy the virtual resource allocation condition, determining whether the preset amount of virtual resources are held in the blockchain account corresponding to the user identifier on the blockchain; if the preset amount of virtual resources are held in the blockchain account corresponding to the user identifier on the blockchain, transferring the preset amount of virtual resources held in the blockchain account into the virtual resource pool.

Optionally, verifying whether a service indicator of the target user within a preset service cycle satisfies a virtual resource allocation condition includes any one of: collecting a service indicator of the target user within a preset service cycle, and determining whether the collected service indicator satisfies the virtual resource allocation condition; searching for a verification result for the service indicator of the target user within a preset service cycle, where the verification result was published to the blockchain by a verifier to be deposited as a credential on the blockchain, and determining whether the service indicator satisfies the virtual resource allocation condition based on the verification result; or searching for a user list of users whose service indicators within the preset service cycle satisfy the virtual resource allocation condition, where the user list was published by the service operator to the blockchain to be deposited on the blockchain as a credential; and matching the user identifier of the target user carried in the resource allocation transaction with user identifiers in the user list, to determine whether the service indicator satisfies the virtual resource allocation condition.

Optionally, the service includes a payment; the service indicator includes a number of payment orders; the virtual resource allocation condition includes any one of: the number of payment orders in a preset service cycle reaching a preset threshold; an average number of payment orders of all units of the service cycle within a preset service cycle reaching a preset threshold; or the number of payment orders in each unit of the service cycle within a preset service cycle reaching a preset threshold.

Optionally, the virtual resource is prohibited from being transferred between blockchain accounts on the blockchain.

Optionally, the method further includes: receiving a resource exchange transaction sent by a client, wherein the resource exchange transaction includes a user identifier of a target user and an amount of target virtual resources to be exchanged; in response to the resource exchange transaction, invoking verification logic in a smart contract deployed in the blockchain to verify whether the target virtual resources satisfy a virtual resource exchange condition; and if the target virtual resources satisfy the virtual resource exchange condition, further invoking virtual resource exchange logic in the smart contract to generate a permitted exchange event corresponding to the target virtual resources, and publishing the permitted exchange event to the blockchain to be deposited as a credential, wherein when a payment platform monitors the permitted exchange event deposited on the blockchain as a credential, the payment platform calculates an exchange amount based on an amount of service profits associated with a single piece of virtual resource in the virtual resource pool as deposited as a credential on the blockchain and the amount of the target virtual resources and based on the exchange amount, performs transfer to the exchange account corresponding to the user identifier of the target user.

Optionally, the virtual resources include any one of: virtual stocks that are associated with a service profit revenue of the service operator; virtual assets that are associated with the service profit revenue of the service operator; virtual options that are associated with the service profit revenue of the service operator; or electronic tokens that are associated with the service profit revenue of the service operator.

Optionally, the service operator is a payment platform; or, a merchant accessing the payment platform.

The present disclosure also provides an apparatus for allocating a virtual resource based on a blockchain, including: a first receiving module configured to receive a resource allocation transaction sent by a client, wherein the resource allocation transaction includes a user identifier of a target user; a first verification module configured to, in response to the resource allocation transaction, invoke verification logic in a smart contract deployed in the blockchain to verify whether a service indicator of the target user within a preset service cycle satisfies a virtual resource allocation condition; and an allocation module configured to, if the service indicator satisfies the virtual resource allocation condition, further invoke virtual resource allocation logic in the smart contract, to allocate a preset amount of virtual resources to the target user from a virtual resource pool, and transfer the preset amount of virtual resources to a blockchain account corresponding to the user identifier, wherein virtual resources in the virtual resource pool are associated with service profits of the service operator corresponding to the service.

Optionally, the apparatus further includes: a recycling module configured to, if the service indicator does not satisfy the virtual resource allocation condition, determine whether the preset amount of virtual resources are held in the blockchain account corresponding to the user identifier on the blockchain; if the preset amount of virtual resources are held in the blockchain account corresponding to the user identifier on the blockchain, transfer the preset amount of virtual resources held in the blockchain account into the virtual resource pool.

Optionally, the first verification module further executes any one of: collecting a service indicator of the target user within a preset service cycle, and determining whether the collected service indicator satisfies the virtual resource allocation condition; searching for a verification result for the service indicator of the target user within a preset service cycle, where the verification result was published to the blockchain by a verifier to be deposited as a credential on the blockchain, and determining whether the service indicator satisfies the virtual resource allocation condition based on the verification result; or searching for a user list of users whose service indicators within the preset service cycle satisfy the virtual resource allocation condition, where the user list was published by the service operator to the blockchain to be deposited on the blockchain as a credential; and matching the user identifier of the target user carried in the resource allocation transaction with user identifiers in the user list, to determine whether the service indicator satisfies the virtual resource allocation condition.

Optionally, the service includes a payment; the service indicator includes a number of payment orders; the virtual resource allocation condition includes any one of: the number of payment orders in a preset service cycle reaching a preset threshold; an average number of payment orders of all units of the service cycle within a preset service cycle reaching a preset threshold; or the number of payment orders in each unit of the service cycle within a preset service cycle reaching a preset threshold.

Optionally, the virtual resource is prohibited from being transferred between blockchain accounts on the blockchain.

Optionally, the apparatus further includes: a second receiving module configured to receive a resource exchange transaction sent by a client, wherein the resource exchange transaction includes a user identifier of a target user and an amount of target virtual resources to be exchanged; a second verification module configured to, in response to the resource exchange transaction, invoke verification logic in a smart contract deployed in the blockchain to verify whether the target virtual resources satisfy a virtual resource exchange condition; and an exchange module configured to, if the target virtual resources satisfy the virtual resource exchange condition, further invoke virtual resource exchange logic in the smart contract to generate a permitted exchange event corresponding to the target virtual resources, and publish the permitted exchange event to the blockchain to be deposited as a credential, wherein when a payment platform monitors the permitted exchange event deposited on the blockchain as a credential, the payment platform calculates an exchange amount based on an amount of service profits associated with a single piece of virtual resource in the virtual resource pool as deposited as a credential on the blockchain and the amount of the target virtual resources and based on the exchange amount, performs transfer to the exchange account corresponding to the user identifier of the target user.

Optionally, the virtual resources include any one of: virtual stocks that are associated with a service profit revenue of the service operator; virtual assets that are associated with the service profit revenue of the service operator; virtual options that are associated with the service profit revenue of the service operator; or electronic tokens that are associated with the service profit revenue of the service operator.

Optionally, the service operator is a payment platform; or, a merchant accessing the payment platform.

In the above technical solution, by anchoring the virtual resources in the virtual resource pool with the service profits of the service operator, and deploying a smart contract on the blockchain to allocate virtual resources to users, by constructing a transaction through the client to invoke the smart contract, users can trigger allocation of service profits of the service operator in the form of virtual resources to user groups whose service indicators within a preset service cycle satisfy the virtual resource allocation condition. Thereby, it can realize allocating service profits of service operators to high-value users whose service indicators within a preset service cycle satisfies a certain condition.

DETAILED DESCRIPTION OF THE EXAMPLES

Figure 1:
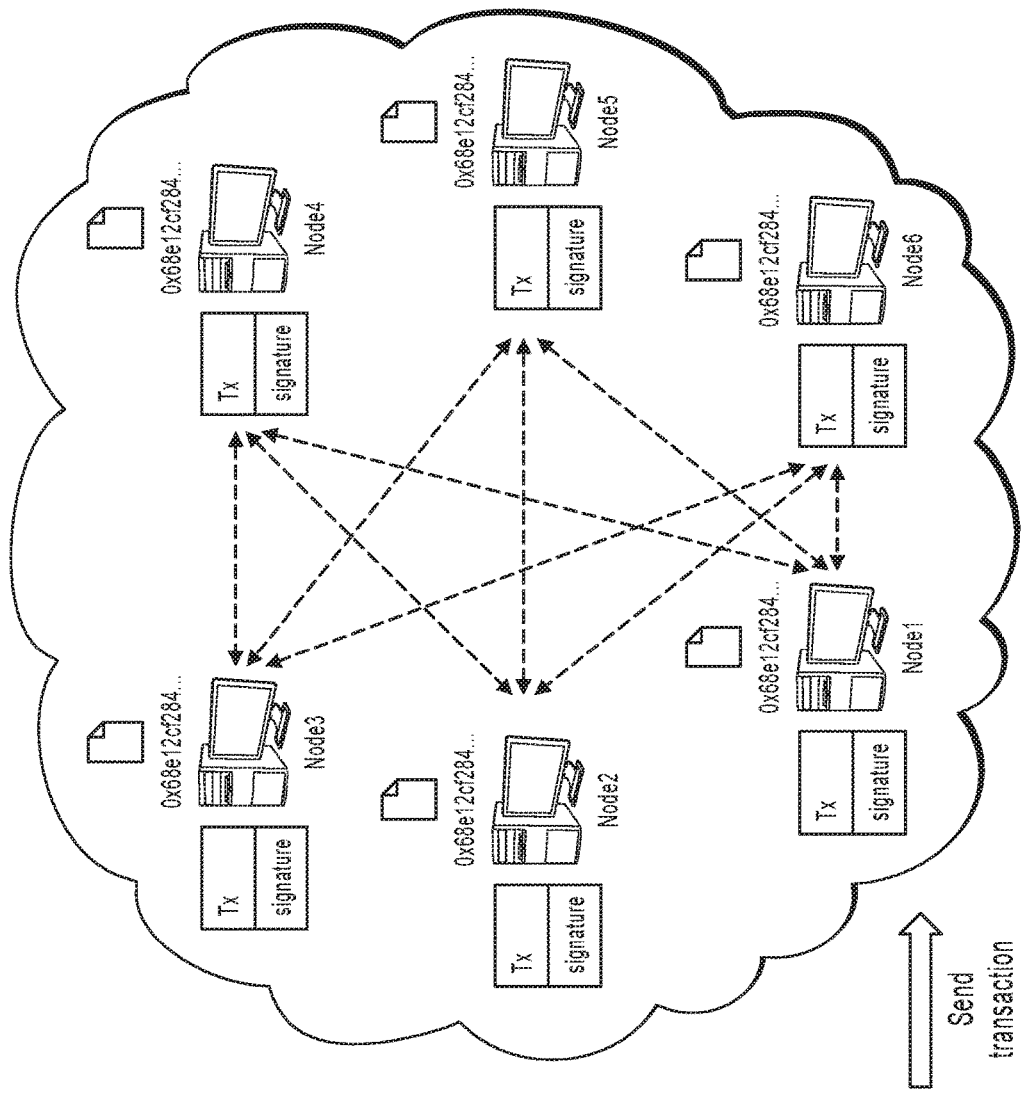
FIG. 1 is a schematic diagram illustrating a process of creating a smart contract according to an embodiment of the present disclosure.
Figure 1:
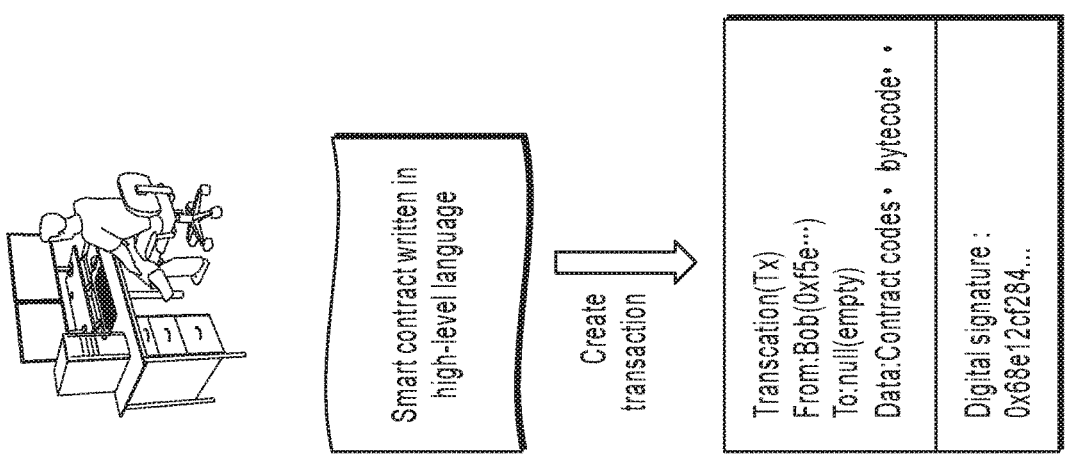

Embodiments will be described in detail here, examples of which are illustrated in the accompanying drawings. When the following description refers to the accompanying drawings, the same numerals in different drawings represent the same or similar elements unless otherwise indicated. The embodiments described in the following examples do not represent all embodiments consistent with one or more embodiments of the present disclosure. Rather, they are merely examples of apparatuses and methods consistent with some aspects of one or more embodiments of the present disclosure, as detailed in the appended claims.

It should be noted that, in other embodiments, the steps of the corresponding method are not necessarily performed in the order shown and described in the present disclosure. In some other embodiments, the method can include more or fewer steps than described in the present disclosure. In addition, a single step described in the present disclosure can be divided into multiple steps for description in other embodiments. In some embodiments, multiple steps described in the present disclosure can be combined into a single step.

Blockchains are generally divided into three types: public blockchain, private blockchain, and consortium blockchain. In addition, there can be combinations of the types, such as private blockchain+consortium blockchain, consortium blockchain+public blockchain, etc.

Here, the most decentralized is the public blockchain. The public blockchain is represented by Bitcoin and Ethereum. Participants (also known as nodes in the blockchain) joining the public blockchain can read data records on the chain, participate in transactions, and compete for the accounting right for latest blocks. Moreover, each node can freely join or leave the network and perform related operations.

On the contrary, for the private blockchain, the write permission of the network is controlled by an organization or institution, and the data read permission is regulated by the organization. In simple terms, a private blockchain can be a weakly centralized system with strict restrictions on nodes and having a small number of nodes. This type of blockchain is more suitable for internal use by specific institutions.

The consortium blockchain is a blockchain between the public blockchain and the private blockchain, which can achieve "partial decentralization". Each node in the consortium blockchain usually has a corresponding entity or organization. Nodes are authorized to join the network and form a stakeholder alliance to jointly maintain the operation of the blockchain.

Based on the basic characteristics of a blockchain, a blockchain is usually composed of several blocks. In each of these blocks, a timestamp corresponding to the creation time of the block is recorded, and all of the blocks form a time-ordered data chain based on the timestamps recorded in the blocks.

The real data generated by the physical world can be constructed into a standard transaction format supported by the blockchain, and then post to the blockchain, and the node devices in the blockchain will perform consensus processing on the received transactions. After reaching a consensus, the transaction will be packaged into a block by the node device that acts as an accounting node in the blockchain, and the certificate will be persisted in the blockchain.

The consensus algorithms supported in the blockchain can include the following two types.

A first type of consensus algorithm includes a consensus algorithm in which the node devices have to compete for the accounting right of each round of accounting cycle, for example, consensus algorithms such as Proof of Work (POW), Proof of Stake (POS), appointment Consensus algorithms such as Delegated Proof of Stake (DPOS).

A second type of consensus algorithm includes a consensus algorithm that an accounting node is elected in advance for each round of accounting cycle (without the need to compete for the accounting right), for example, consensus algorithms such as Practical Byzantine Fault Tolerance (PBFT).

In a blockchain network applying the first type of consensus algorithm, node devices that compete for the accounting right can execute a transaction upon receiving the transaction. One of the node devices competing for the accounting right can win in the current round of contention for the accounting right and become the accounting node. The accounting node can package the received transaction with other transactions to generate the latest block, and send the generated latest block or the block header of the latest block to other node devices for consensus.

In a blockchain network applying the second type of consensus algorithm, the node device having the accounting right has been agreed before the current round of accounting. Therefore, upon receiving a transaction, a node device, if the node device is not the accounting node of the current round, can send the transaction to the accounting node. The accounting node of the current round can execute the transaction during or before the transaction is packaged with other transactions to generate the latest block. After the accounting node generates the latest block, the accounting node can send the latest block or the block header of the latest block to other node devices for consensus.

As previously described, no matter which consensus algorithm is adopted by the blockchain, the accounting node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the accounting process of the blockchain. The other nodes can also execute the transaction contained in the block during the process of verifying the latest block or block header sent by the accounting node.

In the field of blockchain technology, there is an important concept: account. Taking Ethereum as an example, accounts are divided into two types: external accounts and contract accounts. An external account is an account controlled by a user. A contract account is an account containing contract codes (that is, smart contracts) which is created by a user through an external account. For some blockchain projects (such as the blockchain provided by ANT FINANCIAL) derived from the Ethereum-based architecture, the account types supported by the blockchain can be further expanded, which is not limited in the present description.

For an account in the blockchain, a structure can be used to maintain the account state of the account. When a transaction in a block is executed, the state of the account associated with the transaction in the blockchain can also changes.

Taking Ethereum as an example, the structure of an account can include fields such as Balance, Nonce, Code, and Storage.

The Balance field is configured to maintain the current account balance of the account.

The Nonce field is configured to maintain the number of transactions for this account. It is a counter used to ensure that each transaction can be processed only once, effectively avoiding replay attacks.

The Code field is configured to maintain the contract codes of the account. In some embodiments, the Code field maintains the hash value of the contract codes. Therefore, the Code field is also commonly called the Codehash field.

The Storage field is configured to maintain the storage content of the account (the field value is null by default). In some embodiments, for a contract account, an independent storage space is allocated to store the storage content of the contract account. The independent storage space can be referred to as the account storage of the contract account. The storage content of the contract account can be constructed as a data structure of an MPT (Merkle Patricia Trie) tree and stored in the independent storage space. Here, the MPT tree constructed based on the storage content of the contract account is also commonly referred to as a Storage tree. The Storage field can maintain the root node of the Storage tree. Therefore, the Storage field is also commonly called the StorageRoot field.

For an external account, the field values of the Code field and the Storage field are both nulls.

For most blockchain projects, Merkle trees can be used. In some cases, data structures based on Merkle trees are used to store and maintain data. Take Ethereum as an example. Ethereum uses the MPT tree (a variant of Merkle tree) as a data organization form to organize and manage important data such as account states and transaction information.

For data that needs to be stored and maintained in the blockchain, Ethereum designed three MPT trees, which are MPT state tree, MPT transaction tree, and MPT receipt tree.

The MPT state tree is an MPT tree formed by the account state data of accounts in the blockchain. The MPT transaction tree is an MPT tree formed by transaction data in the blockchain. The MPT receipt tree is an MPT tree formed by transaction receipts corresponding to the transactions in the block respectively, wherein each transaction receipt is generated after the execution of the corresponding transaction in the block is completed. The hash values of the root nodes of the MPT state tree, the MPT transaction tree, and the MPT receipt tree are eventually added to the block header of the corresponding block.

The MPT transaction tree and the MPT receipt tree correspond to blocks, that is, each block has its own MPT transaction tree and MPT receipt tree. The MPT state tree is a global MPT tree, which does not correspond to a specific block, but covers the account state data of all accounts in the blockchain.

The organized MPT transaction tree, MPT receipt tree, and MPT state tree are eventually stored in a Key-Value database (such as LevelDB) that adopting a multi-level data storage structure.

The database adopting a multi-level data storage structure can adopt a multi-level data storage structure and can be divided into n-level data storages. For example, the data storage at each level can be set to L0, L1, L2, L3, ... L (n−1) in that order. For each level of data storage in the database, the smaller the level number is, the higher the level is. For example, L0 stores the latest data of several blocks, and L1 stores the second latest data of several blocks, and so on.

Here, the reading and writing performance of the storage medium corresponding to the data storage at each level can also have performance differences. For example, the reading and writing performance of the storage medium corresponding to a high-level (that is, with a small level number) data storage can be higher than the reading and writing performance of the storage medium corresponding to a low-level (that is, with a large level number) data storage. In some cases, high-level data storage can use storage medium with higher storage cost and better storage performance, while lower-level data storage can use storage medium with lower unit cost and larger capacity.

It should be noted that for each latest block generated by the blockchain, after the transactions in the latest block are executed, states of the relevant accounts (either external accounts or contract accounts) of these executed transactions in the blockchain usually changes with them.

For example, after execution of a "transfer transaction" in the block is completed, the balances (that is, the value of the Balance field of these accounts) of the sending account and the receiving account related to the "transfer transaction" can also change with it.

After execution of the transaction of the node device in the latest block generated by the blockchain is completed, since the account state in the current blockchain has changed, the node device may build an MPT state tree based on the current account state data of all accounts in the blockchain, to maintain the latest states of all accounts in the blockchain.

That is, whenever a latest block is generated in the blockchain, execution of the transaction in the latest block is completed, and the account states in the blockchain change, the node device may rebuild an MPT state tree based on the latest account state data of all accounts in the blockchain.

In other words, each block in the blockchain has a corresponding MPT state tree. The MPT state tree maintains the latest account states of the accounts in the blockchain after execution of the transactions in the block is completed.

In some cases, whether it is a public, private or consortium chain, it is possible to provide the function of a smart contract. A smart contract on the blockchain is a contract that can be triggered by transactions on the blockchain. Smart contracts can be defined in the form of code.

Taking Ethereum as an example, Ethereum supports users to create and invoke some complex logic in the Ethereum network. Ethereum is a programmable blockchain, and its core is the Ethereum Virtual Machine (EVM). Each Ethereum node can run EVM. EVM is a Turing-complete virtual machine, through which a variety of complex logic can be implemented. Users issuing and invoking smart contracts in Ethereum are run on EVM. In fact, EVM directly runs virtual machine code (virtual machine bytecode, hereinafter referred to as "bytecode"), so smart contracts deployed on the blockchain can be bytecode.

As shown in FIG. 1, after Bob sends a transaction containing the information about creating a smart contract to the Ethereum network, the EVM of node 1 can execute this transaction and generate a corresponding contract instance. "0x68e12cf284 ... " in node 1 represents the address of this contract. The field value of the Data field of the transaction can be byte code, and the field value of the To field of the transaction is a null (empty) account. When a consensus is reached between the nodes through a consensus mechanism, this smart contract is successfully created, and subsequent users can invoke this smart contract.

After the smart contract is created, a contract account corresponding to the smart contract appears on the blockchain and has an address. Contract code (Code) and account storage (Storage) will be stored in the account storage of the contract account. The behavior of the smart contract is controlled by the contract code, and the smart contract account storage saves the state of the smart contract. In other words, smart contracts enable virtual accounts containing contract codes and account storage to be generated on the blockchain.

As mentioned earlier, the Data field of the transaction containing creation of a smart contract can store the bytecode of the smart contract. A Bytecode consists of a series of bytes, and each of the bytes can determine an operation. Based on multiple considerations such as development efficiency and readability, developers can choose not to write bytecodes directly, but choose a high-level language to write smart contract codes. For example, the high-level language can be such as Solidity, Serpent, LLL language, and the like. Smart contract codes written in a high-level language can be compiled by a compiler to generate bytecodes that can be deployed on the blockchain.

Taking the Solidity language as an example, the contract codes written in Solidity is similar to the classes in the object-oriented programming language. In a smart contract, multiple members can be declared, including state variables, functions, function modifiers, events, and so on. A state variable is a value that is stored in the Account Storage field of the smart contract and is used to save the state of the contract.

Figure 2:
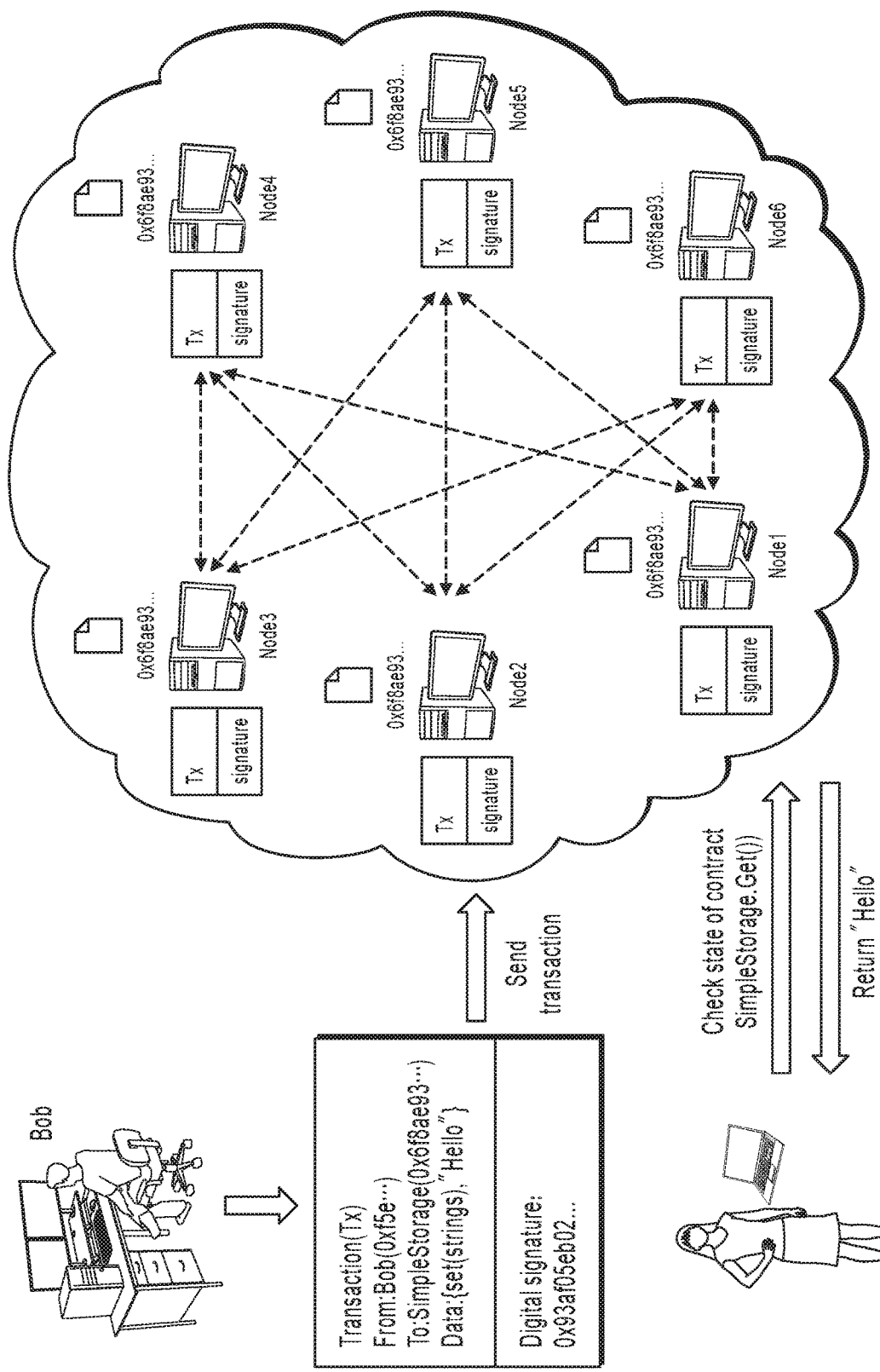
FIG. 2 is a schematic diagram illustrating a process of invoking a smart contract according to an embodiment of the present disclosure.

As shown in FIG. 2, still taking Ethereum as an example, after Bob sends a transaction containing information about invoking smart contracts to the Ethereum network, the EVM of node 1 can execute this transaction and generate a corresponding contract instance. The From field of the transaction in FIG. 2 is used to record the address of the account that initiated the invoking of the smart contract, the To field is used to record the address of the invoked smart contract, and the Data field of the transaction is used to record the method and parameters of the invoking smart contract. After invoking the smart contract, the account state of the contract account can change. Subsequently, a client can check the account state of the contract account through the connected blockchain node (such as node 1 in FIG. 2).

The smart contract can be independently executed by each node in the blockchain network in a prescribed manner, and all execution records and data are stored on the blockchain, so after such transaction is completed, transaction credentials that cannot be tampered with and will not be lost are stored on the blockchain.

Figure 3:
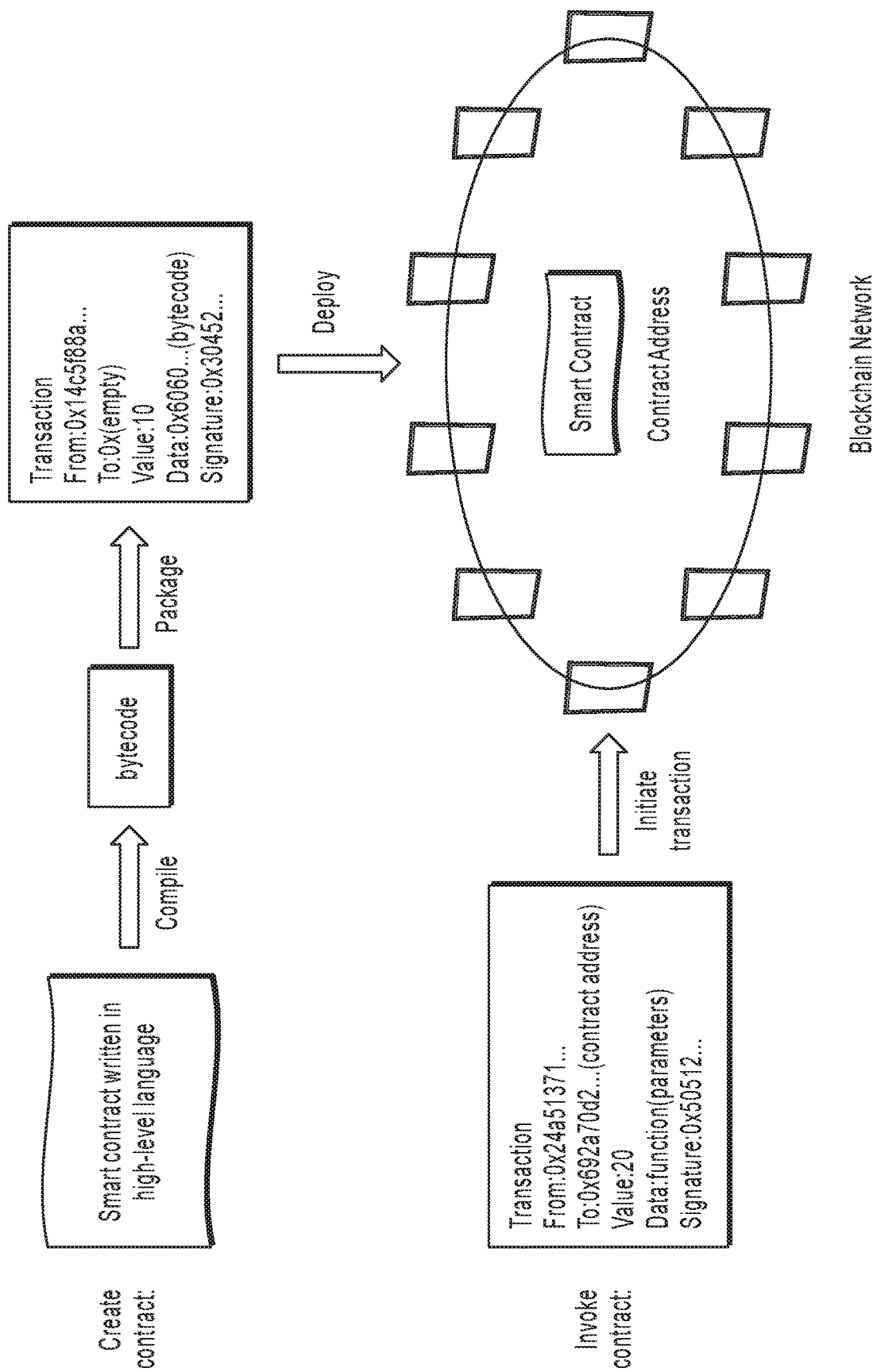
FIG. 3 is a schematic diagram illustrating a process of creating a smart contract and invoking a smart contract according to an embodiment of the present disclosure.

The diagram of creating a smart contract and invoking a smart contract is shown in FIG. 3. To create a smart contract in Ethereum, it may go through the processes of writing a smart contract, turning the smart contract into bytecodes, and deploying the bytocodes to the blockchain. Invoking a smart contract in Ethereum is to initiate a transaction that points to the address of the smart contract. The EVM of each node can execute the transaction separately, and the smart contract codes are distributed to run in the virtual machine of each node in the Ethereum network.

In the present disclosure, the objective is to provide a technical solution based on a smart contract deployed on a blockchain, to allocate service profits of service operators in the form of virtual resources to high-value users in the user group of the service operator.

On the one hand, the service operator can create a virtual resource pool in advance, and anchor the virtual resources in the virtual resource pool to its own service profit. For example, the service operator can take out a portion of the annual service profit according to a certain percentage to form a profit pool and anchor the profit pool with the virtual resources in the virtual resource pool as the value support of the virtual resources in the virtual resource pool.

On the other hand, service operators can also deploy smart contracts on the blockchain to allocate virtual resources to users.

The deployed smart contract can include verification logic and virtual resource allocation logic. The verification logic can be used to verify whether a user's service indicator within a preset service cycle satisfies a virtual resource allocation condition. The virtual resource allocation condition can be written by the developer of the smart contract in the form of codes.

The virtual resource allocation logic is used to allocate a virtual resource for a user from a virtual resource pool when a user's service indicator within a preset service cycle satisfies the virtual resource allocation condition, and transfer the allocated virtual resource to the user's Blockchain account. The total amount of virtual resources that can be allocated in the virtual resource pool can also be written by the developer of the smart contract in the form of codes.

After the deployment of the smart contract is completed, the service operator or the ordinary user of the service operator can construct a resource allocation transaction through the client. The resource allocation transaction can carry the user identifier of the target user. Then, the resource allocation transaction is published to the blockchain to invoke the smart contract deployed on the blockchain to allocate a virtual resource to the target user.

Upon receiving the resource allocation transaction, the node device in the blockchain can respond to the resource allocation transaction and invoke the verification logic in the smart contract to verify whether the service indicator of the target user within a preset service cycle satisfies the virtual resource allocation condition. If so, the virtual resource allocation logic in the smart contract can be further called to allocate a preset amount of virtual resources to the target user from the virtual resource pool, and the preset amount of virtual resources are transferred to the blockchain account corresponding to the user identifier of the target user.

In the above technical solution, by anchoring the virtual resources in the virtual resource pool with the service profits of the service operator, and deploying a smart contract on the blockchain to allocate virtual resources to users, by constructing a transaction through the client to invoke the smart contract, users can trigger allocation of service profits of the service operator in the form of virtual resources to user groups whose service indicators within a preset service cycle satisfy the virtual resource allocation condition. Thereby, it can realize allocating service profits of service operators to high-value users whose service indicators within a preset service cycle satisfies a certain condition.

Figure 4:
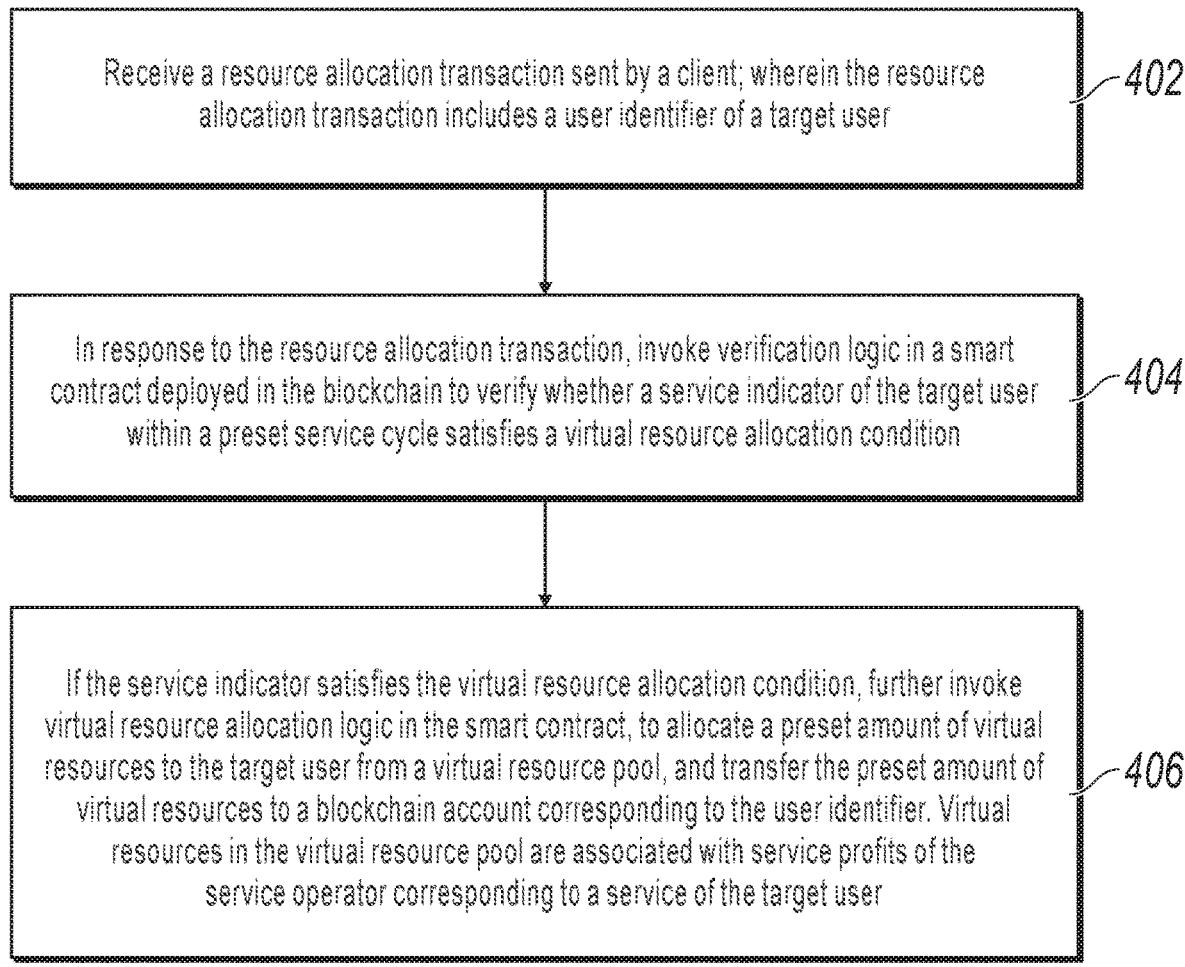
FIG. 4 is a flowchart illustrating a method for allocating a virtual resource based on a blockchain according to an embodiment of the present disclosure.

Referring to FIG. 4, which is a flowchart illustrating a method for allocating a virtual resource based on a blockchain according to an embodiment. As shown in FIG. 4, the method is applied to a node device in a blockchain. The method includes the following steps.

At step 402, a resource allocation transaction sent by a client is received, wherein the resource allocation transaction includes a user identifier of a target user.

At step 404, in response to the resource allocation transaction, verification logic in a smart contract deployed in the blockchain is invoked to verify whether a service indicator of the target user within a preset service cycle satisfies a virtual resource allocation condition.

At step 406, if the service indicator satisfies the virtual resource allocation condition, virtual resource allocation logic in the smart contract is further invoked, to allocate a preset amount of virtual resources to the target user from a virtual resource pool, and transfer the preset amount of virtual resources to a blockchain account corresponding to the user identifier. Virtual resources in the virtual resource pool are associated with service profits of the service operator corresponding to the service.

In some embodiments of the present disclosure, the virtual resources can include any form of resource object that can be held by a blockchain account (including an external account and a contract account) on the blockchain.

The form of the virtual resource is not limited in the present disclosure, and can be flexibly defined in one embodiment.

For example, in one embodiment, the virtual resources can include, but are not limited to, the following forms: virtual stocks that are associated with a service profit revenue of the service operator; virtual assets that are associated with the service profit revenue of the service operator; virtual options that are associated with the service profit revenue of the service operator; or electronic tokens that are associated with the service profit revenue of the service operator, and so on.

The blockchain account holds virtual resources, which can include the holding forms shown below.

In one form, a blockchain account holding virtual resources can refer to adding the virtual resources to the Balance field of the blockchain account as a balance.

For example, for virtual resources such as virtual stocks, virtual assets, electronic vouchers, etc., it can count the value by the balance. When a blockchain account holds such virtual resources, it can directly add the virtual resources to the Balance field of the blockchain account as a balance.

In another form, the meaning of the Balance field of the blockchain account can be expanded so that the Balance field no longer only represents the amount of "balance", but is used to maintain address information of virtual resources held by the blockchain. In this case, the blockchain account holding virtual resources can refer to adding the address information of the virtual resources to the Balance field of the blockchain account.

For example, for virtual resources such as virtual assets, the actual associated value may be not fixed. For example, users can flexibly use various types of assets in the real world as anchors to "issue" virtual assets on the blockchain. Therefore, for virtual resources such as virtual assets, where the value may not be counted by the amount of balance, when holding such virtual resources, the blockchain account can directly add the address information of the virtual assets to the Balance field of the blockchain account.

It should be noted that in the present disclosure, virtual resources can be allocated to high-value users whose service indicators satisfy a certain condition within the preset service cycle. Therefore, virtual resources allocated to such users can be understood as an incentive measure by the service operator for high-value users in the user group. In this case, the virtual resources held by each blockchain account on the blockchain can be prohibited from being transferred between blockchain accounts on the blockchain.

For example, taking the virtual resources as virtual stocks as an example, for virtual stocks held by each blockchain account, it can be agreed that the virtual stocks can only be held by blockchain accounts of high-value users whose service indicators satisfy a certain condition within a preset service cycle, and is prohibited from being transferred between the blockchain accounts of different users.

In the present disclosure, the service operator can create a virtual resource pool in advance, and anchor the virtual resources in the virtual resource pool with its own service profits.

The virtual resource pool can be a blockchain account corresponding to the service operator on the blockchain, and the blockchain account can hold virtual resources that the service operator can use for allocation. For example, in one embodiment, the blockchain account as the virtual resource pool can be a contract account corresponding to a smart contract deployed by the service operator on the blockchain.

Anchoring virtual resources and service profits as described in the present disclosure refers to taking the service profits as the value support of the virtual resources. The service operator can take out a portion of annual service profits according to a certain percentage to form a profit pool (Funds Pool), as the value support (also called anchors) of virtual resources in the virtual resource pool, to complete the anchoring between virtual resources in the virtual resource pool and the service profits.

For example, taking the virtual resource as virtual stocks as an example, after anchoring the virtual stocks with the service profits of the service operator, the amount of funds that can be exchanged for one virtual stock can be calculated based on the total amount of the funds in the service profit pool and the total amount of the virtual resources in the virtual resource pool, thus giving the virtual stock real economic value.

The total amount of virtual resources that can be allocated in the virtual resource pool is not limited in the present description. In some embodiments, the service operator can determine based on the total amount of service profits associated with the virtual resource pool.

For example, taking the virtual resources as virtual stocks as an example, the service operator can determine the total number of virtual stocks that may be "issued" based on the total amount of the funds in the service profit pool.

After anchoring the virtual resources in the virtual resource pool with the service profits of the service operator, the service operator can also calculate the amount of service profits associated with a single piece of virtual resource in the virtual resource pool (i.e. the economic value of a single piece of virtual resource) based on the total amount of service profits associated with the virtual resource pool and the amount of virtual resources in the virtual resource pool, and then the calculated amount of service profits associated with a single piece of virtual resource in the virtual resource pool is published to the blockchain to be deposited as a credential.

For example, in one embodiment, a credential deposit transaction can be constructed based on the calculated amount of service profits associated with a single piece of virtual resource in the virtual resource pool, and published to the blockchain. Node devices in the blockchain perform consensus processing, and after the consensus is reached, the accounting node in the blockchain will package the credential deposit transaction into blocks for persistent deposit in the blockchain as a credential.

On the other hand, the service operators can also deploy a smart contract on the blockchain to allocate virtual resources to users. The process of deploying a smart contract on the blockchain will not be described in detail, and can be shown with reference to the smart contract creation process shown in FIG. 1. The contract account corresponding to the smart contract on the blockchain can be used as the virtual resource pool described above, holding the virtual resources that the service operator can use for allocation.

The smart contract deployed can include verification logic and virtual resource allocation logic. The verification logic and virtual resource allocation logic can both be invocable contract codes developed by a smart contract developer of the service operator. For example, the verification logic and virtual resource allocation logic can include an invocable function.

The verification logic can be used to verify whether the user's service indicator within a preset service cycle satisfies the virtual resource allocation condition. The virtual resource allocation condition can be written into the smart contract in the form of codes by the developer of the smart contract.

The virtual resource allocation logic can be used to allocate a virtual resource for a user from a virtual resource pool when a user's service indicator within a preset service cycle satisfies the virtual resource allocation condition, and transfer the allocated virtual resource to the blockchain account of the user.

After the deployment of the smart contract is completed, the service operator or an ordinary user of the service operator can construct a resource allocation transaction through the client and publish the resource allocation transaction to the blockchain to invoke the smart contract deployed on the blockchain, to allocate a virtual resource to the target user. The service operator is the party that allocates the virtual resources. The target user refers to the party to which the virtual resources are allocated. The resource allocation transaction is a type of transaction that invokes a smart contract. The resource allocation transaction can carry therein the address of the smart contract and the user identifier of the target user.

In an embodiment, on a client terminal of an ordinary user, an interaction option (such as an interaction button) of "receiving virtual resources" can be provided. The back end of the service operator can collect service indicators of all users within the preset service cycle, select users whose service indicators satisfy the virtual resource allocation condition as high-value users, and then send to these high-value users reminders of "receiving virtual resources" through the client terminal.

When receiving the reminder through the client terminal, these high-value users can operate the interaction options to trigger the client terminal to automatically "package" a resource allocation transaction and publish the resource allocation transaction to the blockchain to invoke the smart contract deployed on the blockchain to "receive" virtual resources.

In another embodiment, on a terminal in the back end of the service operator, an interaction option (such as an interaction button) for "issuing virtual resources" can be provided. The back end of the service operator can collect service indicators of all users within the preset service cycle, select users whose service indicators satisfy the virtual resource allocation condition as high-value users, and then send to a manager of the service operator a reminder of "receiving virtual resources" through the terminal.

When the manager of the service operator receives the reminder through the terminal in the back end of the service operator, the manager can operate the interaction option to trigger the client to automatically "package" a resource allocation transaction and publish the resource allocation transaction to the blockchain, to invoke the smart contract deployed on the blockchain to "issue" virtual resources to the target user.

In some embodiment of the present disclosure, after receiving the resource allocation transaction, the node device in the blockchain can perform consensus processing on the resource allocation transaction with other node devices, and after a consensus is reached, the node device acting as the accounting node in the blockchain can package the resource allocation transaction together with other transactions into a block, and perform persistent credential deposit in the blockchain. The consensus processing process of the resource allocation transaction will not be described in the present disclosure.

For the resource allocation transaction packaged into a block, the node devices in the blockchain can execute the resource allocation transaction, and execute the corresponding execution codes of the verification logic in the smart contract to verify whether the target user's service indicator within a preset service cycle satisfies the virtual resource allocation condition.

It should be noted that the process of verifying whether the service indicator of the target user within a preset service cycle satisfies the virtual resource allocation condition is a process of selecting a valued user from the user group of the service operator.

In one embodiment, the selecting process can be completed directly by a smart contract. In one embodiment, the selecting process can be completed by other verifying parties or the service operator, and after that, the corresponding selection result is published to the block to be deposited as a credential. Then, the smart contract can take the selection result deposited as a credential on the blockchain as a reference, to further identify whether the target user is a valued user.

In an embodiment, if the selecting process is completed by a smart contract, the execution logic corresponding to the verification logic in the smart contract can collect the service indicator of the target user within a preset service cycle, and determine whether the collected service indicator satisfies the virtual resource allocation condition.

In this case, when the node device in the blockchain runs the execution codes corresponding to the verification logic in the smart contract to verify that the service indicator of the target user within a preset service cycle satisfies the virtual resource allocation condition, the node device can autonomously collect the service indicator of the target user within a preset service cycle, and then further determine whether the collected service indicator satisfies the virtual resource allocation condition.

That is, the smart contract autonomously collects the service indicator of the target user within a preset service cycle to determine whether the service indicator satisfies the virtual resource allocation condition.

In another embodiment, if the selecting process is completed by a third party verifier, after receiving the resource allocation transaction, the node device in the blockchain can, in addition to the consensus processing of the resource allocation transaction with other node devices, copy the resource allocation transaction and submit the copy to the verifier of the third party based on the user identifier of the target user carried in the resource allocation transaction. The verifier can, based on the user identifier of the target user carried in the resource allocation transaction, collect service indicator of the target user within a preset service cycle, initiate a verification of the service indicator to determine whether the service indicator satisfies the virtual resource allocation condition, and then publish the relevant verification result to the blockchain to be deposited as a credential.

In this case, the execution logic corresponding to the verification logic in the smart contract can search for the verification result for the service indicator of the target user within a preset service cycle, where the verification result was published to the blockchain by the verifier to be deposited as a credential on the blockchain, and determine whether the service indicator satisfies the virtual resource allocation condition based on the verification result.

Correspondingly, when the node device in the blockchain runs the execution codes corresponding to the verification logic in the smart contract to verify whether the service indicator of the target user within a preset service cycle satisfies the virtual resource allocation condition, the node device can search for the verification result deposited on the blockchain as a credential, and determine whether the service indicator satisfies the virtual resource allocation condition based on the verification result.

That is, the smart contract may not independently collect the service indicator of the target user within a preset service cycle to determine whether the service indicator satisfies the virtual resource allocation condition. Instead, the smart contract can determine whether the service indicator satisfies the virtual resource allocation condition based on the verification result of the third party.

In another embodiment, if the selecting process is completed by the service operator, the back end of the service operator can collect the service indicator of the user within a preset service cycle during the daily service operation process, perform statistical analysis on the collected service indicators to select users whose service indicators satisfy the virtual resource allocation condition, and generate a user list based on the user identifiers of these selected users. Then, the user list is published to the blockchain to deposit it as a credential.

In this case, the execution logic corresponding to the verification logic in the smart contract can search for the user list of users whose service indicators within the preset service cycle satisfy the virtual resource allocation condition, where the user list was published by the service operator to the blockchain to be deposited on the blockchain as a credential, match the user identifier of the target user carried in the resource allocation transaction with the user identifiers in the user list, to determine whether the service indicator of the target user satisfies the virtual resource allocation condition.

Correspondingly, when the node device in the blockchain runs the execution codes corresponding to the verification logic in the smart contract to verify whether the service indicator of the target user within a preset service cycle satisfies the virtual resource allocation condition, the node device can search for the user list deposited on the blockchain as a credential, match the user identifier of the target user carried in the resource allocation transaction with the user identifiers in the user list. If the user identifier of the target user carried in the resource allocation transaction matches any user identifier in the user list, it can be determined that the service indicator of the target user satisfies the virtual resource allocation condition. Otherwise, it can determine that the service indicator of the target user does not satisfy the virtual resource allocation condition.

That is, the smart contract may not independently collect the service indicator of the target user within a preset service cycle to determine whether the service indicator satisfies the virtual resource allocation condition. Instead, based on the user list of users whose service indicators within the preset service cycle satisfy the virtual resource allocation condition, where the user list was published by the service operator to the blockchain, by matching, it can be determined whether the service indicator of the target user satisfies the virtual resource allocation condition.

In some embodiments of the present disclosure, if after the verification process, it is determined that the service indicator of the target user within a preset service cycle satisfies the virtual resource allocation condition, it can be confirmed that the target user is a high-value user in the user group of the service operator. The node devices in the blockchain can also further run the execution codes corresponding to the virtual resource allocation logic in the smart contract to allocate a preset amount of virtual resources from the virtual resource pool to the target user, and transfer the preset amount of virtual resources to a blockchain account corresponding to the user identifier of the target user.

For example, after the execution of the resource allocation transaction is finished, the account states (account balances) the blockchain account corresponding to the user identifier of the target user and of the contract account that is the virtual resource pool will change. The node device can search for the blockchain account and the contract account corresponding to the user identifier of the target user on the locally stored MPT state tree, and then based on the amount of virtual resources allocated to the target user, update the balance information in the Balance fields of the blockchain account and the contract account (decrease the balance of the contract account and increase the balance of the blockchain account by the same amount), or remove the address information of the virtual resource allocated to the target user from the Balance field of the contract account, and then add the address information to the Balance field of the blockchain account to complete state updates for the blockchain account and contract account.

In some embodiments of the present disclosure, in addition to invoking the smart contract by constructing a resource allocation transaction to allocate virtual resources to target user, a virtual resource recycling mechanism can also be introduced. When the service indicator of the target user within a preset service cycle does not satisfy the virtual resource allocation condition, the virtual resources that have been allocated to the target user are recycled and transferred back to the virtual resource pool.

In the illustrated embodiment, if it is determined, through the verification process, that the service indicator of the target user within a preset service cycle does not satisfy the virtual resource allocation condition, it can be further determined whether the preset amount of virtual resources are held in the blockchain account corresponding to the user identifier of the target user on the blockchain. If so, at this time, the virtual resources held by the blockchain account can be recycled, to transfer the preset amount of virtual resources to the virtual resources pool.

For example, based on the amount of virtual resources that need to be recycled, the balance information in the Balance fields of the blockchain account corresponding to the target user and the contract account can be updated. Or, the address information of the virtual resources that can be recycled is removed from the Balance field of the blockchain account corresponding to the target user and add it to the Balance field of the contract account as the virtual resource pool, to complete the state updates of the blockchain account and contract account.

The amount of the recycled virtual resources can correspond to the amount of the virtual resources allocated to the target user, or all virtual resources held in the blockchain account corresponding to the target user. That is, if the service indicator of the target user within the preset service cycle does not satisfy the virtual resource allocation condition, the preset amount of virtual resources allocated to the target user last time can be recycled, or all virtual resources held by the blockchain account corresponding to the target user are recycled, which is not limited in the present disclosure.

In some embodiments of the present disclosure, the virtual resource allocation condition can be defined by the service operator based on actual virtual resource allocation requirements. The contents of the virtual resource allocation condition and the service indicator are generally determined by the types of service that the service operator operates.

For example, in the illustrated embodiment, the service can be a payment. The service operator can be a payment platform, or a merchant that accesses the payment platform. That is, whether it is a merchant of the payment platform or a merchant of the access payment, the merchant can all act as the operator to allocate their service profits to high-value users in the user group. Correspondingly, the service indicator can be the number of payment orders.

In this case, the virtual resource allocation condition can include, but are not limited to, the following rules.

The number of payment orders within a preset service cycle reaches a preset threshold, for example, the number of payment orders within 30 days reaches N.

In the preset service cycle, the average number of payment orders of all the units of the service cycle reaches a preset threshold, for example, the average number of payment orders per day in 30 days reaches N.

In the preset service cycle, the number of payment orders in each unit of the service cycle reached a preset threshold, for example, the average number of payment orders per day in 30 days reached N.

It should be noted that the payment is taken as an example for illustrative purposes only. In some embodiments, the service operator can flexibly select the type of service indicator and define the corresponding virtual resource allocation condition to select valuable users from the user group based on the actual virtual resource allocation requirements and the specific service type of the service being operated, which will not be enumerated one by one in the present disclosure.

For example, in addition to the several virtual resource allocation conditions shown above, the service operator can further perform selection on the basis of the user group that satisfies the virtual resource allocation condition, and determine top N users in the user group that satisfies the virtual resource allocation condition as valuable users, and in this way, the number of users to allocate virtual resources can be strictly controlled.

In some embodiments of the present disclosure, the target user can also exchange service profits with the service operator when the virtual resources held satisfy a certain virtual resource exchange condition.

For example, taking the virtual resources being virtual stocks or virtual options allocated by the service operator to the target user as an example, the virtual resource exchange condition can refer to a ban lifting condition for virtual stocks or virtual options, and when the virtual stocks or virtual options held by the target user satisfies the ban lifting condition, they can be exchanged to funds with the service operator. For example, in some embodiments, the service operator can set a ban lifting period for virtual stocks or virtual options allocated to users. In this case, the ban lifting condition refers to whether the virtual stocks or virtual options have reached the end of the ban lifting period.

The service operator can also deploy a smart contract for exchanging virtual resources on the blockchain. The deployed smart contract can include verification logic and virtual resource exchange logic. The above verification logic and virtual resource exchange logic may also be invocable contract codes developed by a smart contract developer of a service operator. For example, the verification logic and virtual resource exchange logic can include an invocable function.

The verification logic can be used to verify whether the preset amount of virtual resources held by the user satisfies the virtual resource exchange condition. The virtual resource exchange condition can be written into the smart contract by the developer of the smart contract in the form of codes.

The virtual resource exchange logic can be used to generate a permitted exchange event corresponding to the virtual resources when the virtual resources held by the user satisfy the virtual resource exchange condition, and publish the permitted conversion event to the blockchain for deposit as a credential.

After the deployment of the smart contract is completed, the target user holding the virtual resources can construct a resource exchange transaction through the client and publish the resource exchange transaction to the blockchain to invoke the smart contract deployed on the blockchain, to exchange service profits with the service operator. The resource exchange transaction can include the user identifier of the target user and the mount of target virtual resources to be exchanged.

Upon receiving the resource exchange transaction, the node device in the blockchain can work with other node devices to perform consensus processing on the resource exchange transaction. After reaching a consensus, the node device acting as the accounting node in the blockchain packages the resource exchange transaction into a block together with other transactions, and deposits it in the blockchain as a credential.

For the resource exchange transaction packaged into a block, all the node devices in the blockchain can execute the resource exchange transaction, and the corresponding execution codes of the verification logic in the smart contract to verify whether the target virtual resource satisfies the virtual resource exchange condition.

The content of the virtual resource exchange condition is not limited in the present disclosure, and can be flexibly set by the service operator based on actual exchange requirements. For example, in some embodiments, the virtual resource exchange condition can be a ban lifting condition for the virtual resources.

If it is determined through the verification process that the target virtual resources satisfy the virtual resource exchange condition, the virtual resource exchange logic in the smart contract can be further invoked at this time to generate a permitted exchange event corresponding to the target virtual resources based on the event mechanism of the smart contract, and publish the permitted exchange event to the blockchain to be deposited as a credential. The permitted exchange event can also carry the user identifier of the target user and the amount of the target virtual resources to be exchanged.

For example, in one embodiment, the permitted exchange event can be written into the account storage of the smart contract, or can also be written into the receipt corresponding to the virtual resource exchange transaction as a transaction log generated after the execution of the virtual resource exchange transaction is completed.

In some embodiments of the present disclosure, the service operator can complete the exchange of virtual resources allocated to the user through a third-party payment platform. The payment platform can complete the exchange and transfer of the target virtual resources by monitoring the permitted exchange event generated by the smart contract.

For example, in one embodiment, the payment platform can obtain the generated permitted exchange event by monitoring the latest data generated on the Storage tree constructed based on the storage content in the account storage of the smart contract, or the latest receipt tree of the block.

If the payment platform monitors the permitted exchange event deposited on the blockchain as a credential, the payment platform can calculate the exchange amount based on the amount of service profits associated with a single piece of virtual resource in the virtual resource pool as deposited as a credential on the blockchain and the amount of the target virtual resources. After the calculation is completed, based on the transfer function of the payment platform, according to the exchange amount, funds are transferred to the exchange account corresponding to the user identifier of the target user, to transfer the funds to the exchange account of the target user.

After the payment platform completes the exchange and transfer processing for the target virtual resources, a credential deposit transaction can also be built based on the exchange result, and publish the credential deposit transaction to the blockchain, fort the node devices in the blockchain to perform consensus processing. After the consensus is reached, the accounting node in the blockchain will package the credential deposit transaction into a block for persistent deposit in the blockchain as a credential.

In the above technical solution, by anchoring the virtual resources in the virtual resource pool with the service profits of the service operator, and deploying a smart contract on the blockchain to allocate virtual resources to users, by constructing a transaction through the client to invoke the smart contract, users can trigger allocation of service profits of the service operator in the form of virtual resources to user groups whose service indicators within a preset service cycle satisfy the virtual resource allocation condition. Thereby, it can realize allocating service profits of service operators to high-value users whose service indicators within a preset service cycle satisfies a certain condition.

For example, taking the service being a payment as an example. The service operator can be a payment platform or a merchant connected to the payment platform. The payment platform or merchant can allocate a part of the profits of the previous year in the form of virtual stocks to valuable users who have an "average number of payment orders daily reached N", so that users also have the opportunity to share the profits of the payment platform or the merchant.

Corresponding to the above method embodiment, the present disclosure also provides an embodiment of an apparatus for allocating a virtual resource based on a blockchain. The embodiments of the apparatus for allocating a virtual resource based on a blockchain of the present disclosure can be applied to an electronic device. The apparatus embodiment can be implemented by software, or by hardware or a combination of software and hardware. Taking software implementation as an example, as an apparatus in a logical sense, it is formed by reading the corresponding computer program instructions in the non-volatile memory into the memory through the processor of the electronic device where it is located. In terms of hardware, as shown in FIG. 5, which is a hardware structure diagram of the electronic device where the apparatus for allocating a virtual resource based on a blockchain of the present disclosure is located, in addition to the processor, the memory, the network interface, and the non-volatile memory, the electronic device in which the apparatus is located in the embodiment can generally include other hardware based on the actual function of the electronic device, and details are omitted here for brevity.

Figure 6:
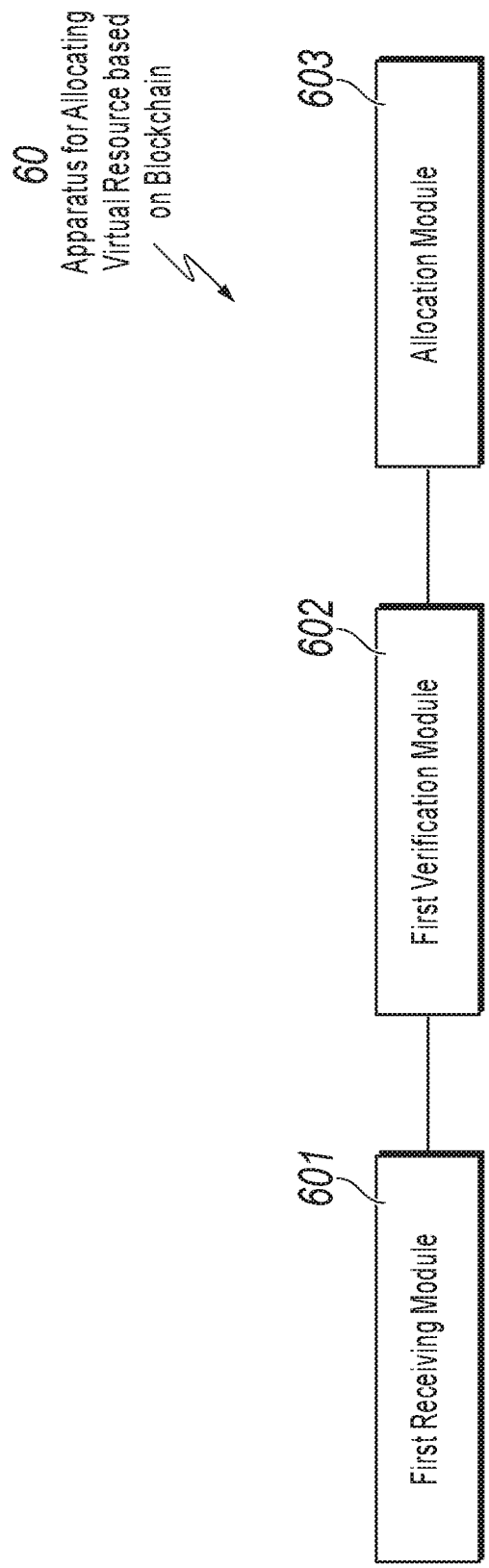
FIG. 6 is a block diagram illustrating an apparatus for allocating a virtual resource based on a blockchain according to an embodiment of the present disclosure.

FIG. 6 is a block diagram illustrating an apparatus for allocating a virtual resource based on a blockchain according to an embodiment of the present disclosure.

Figure 5:
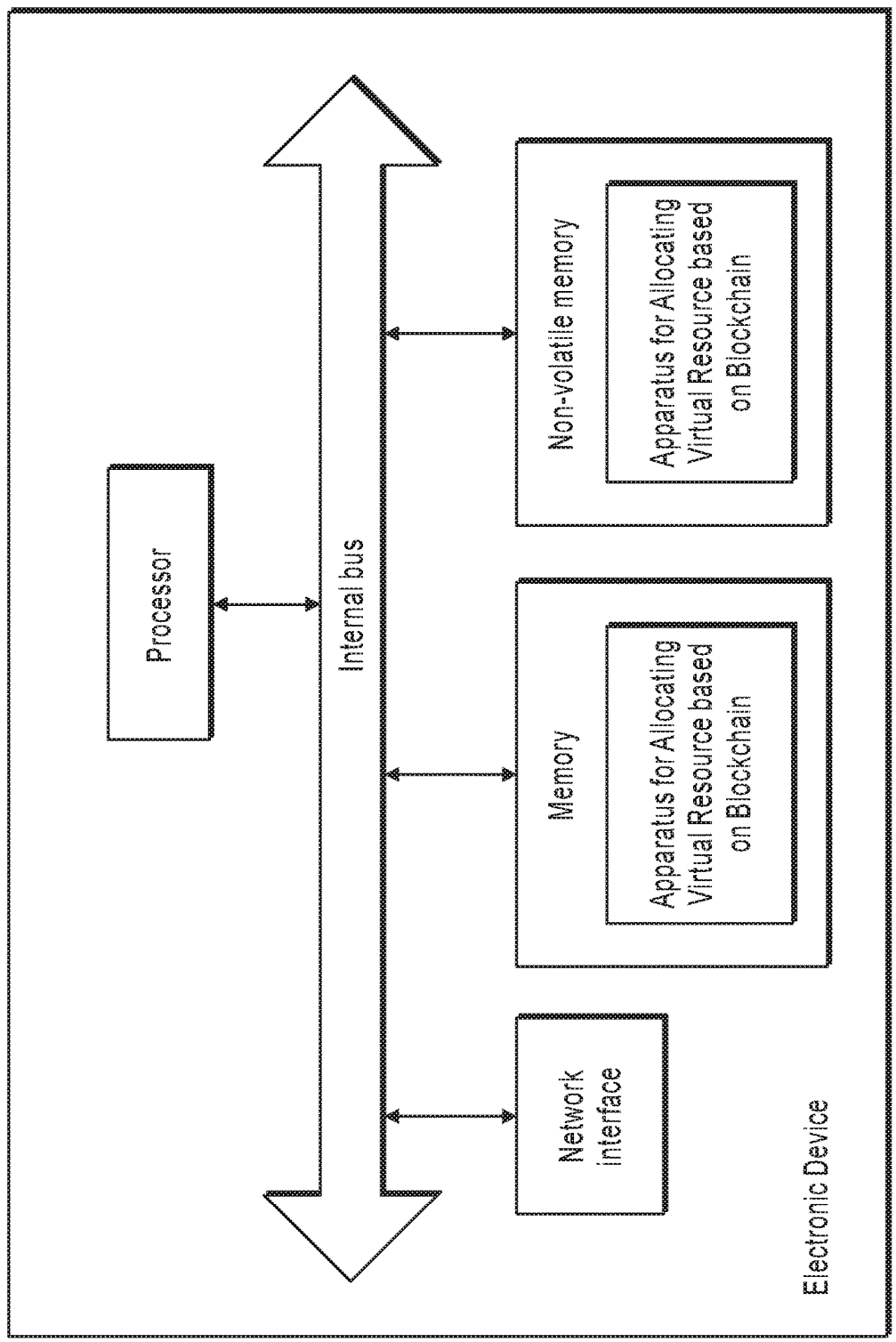
FIG. 5 is a schematic structural diagram illustrating an electronic device according to an embodiment of the present disclosure.

Referring to FIG. 6, the apparatus 60 for allocating a virtual resource based on a blockchain can be applied to the electronic device shown in FIG. 5 and includes: a first receiving module 601 configured to receive a resource allocation transaction sent by a client, wherein the resource allocation transaction includes a user identifier of a target user; a first verification module 602 configured to, in response to the resource allocation transaction, invoke verification logic in a smart contract deployed in the blockchain to verify whether a service indicator of the target user within a preset service cycle satisfies a virtual resource allocation condition; and an allocation module 603 configured to, if the service indicator satisfies the virtual resource allocation condition, further invoke virtual resource allocation logic in the smart contract, to allocate a preset amount of virtual resources to the target user from a virtual resource pool, and transfer the preset amount of virtual resources to a blockchain account corresponding to the user identifier, wherein virtual resources in the virtual resource pool are associated with service profits of the service operator corresponding to the service.

In an embodiment, the apparatus 60 further includes: a recycling module (not shown in FIG. 6) configured to, if the service indicator does not satisfy the virtual resource allocation condition, determine whether the preset amount of virtual resources are held in the blockchain account corresponding to the user identifier on the blockchain; if so, transfer the preset amount of virtual resources held in the blockchain account into the virtual resource pool.

In one embodiment, the first verification module 602 further executes any one of the following: collecting a service indicator of the target user within a preset service cycle, and determining whether the collected service indicator satisfies the virtual resource allocation condition; searching for a verification result for the service indicator of the target user within a preset service cycle, where the verification result was published to the blockchain by a verifier to be deposited as a credential on the blockchain, and determining whether the service indicator satisfies the virtual resource allocation condition based on the verification result; or searching for a user list of users whose service indicators within the preset service cycle satisfy the virtual resource allocation condition, where the user list was published by the service operator to the blockchain to be deposited on the blockchain as a credential; and matching the user identifier of the target user carried in the resource allocation transaction with user identifiers in the user list, to determine whether the service indicator satisfies the virtual resource allocation condition.

In one embodiment, the service includes a payment. The service indicator includes a number of payment orders.

The virtual resource allocation condition includes any one of the following: the number of payment orders in a preset service cycle reaching a preset threshold; an average number of payment orders of all units of the service cycle within a preset service cycle reaching a preset threshold; or the number of payment orders in each unit of the service cycle within a preset service cycle reaching a preset threshold.

In one embodiment, the virtual resource is prohibited from being transferred between blockchain accounts on the blockchain.

In one embodiment, the apparatus 60 further includes: a second receiving module (not shown in FIG. 6) configured to receive a resource exchange transaction sent by a client, wherein the resource exchange transaction includes a user identifier of a target user and an amount of target virtual resources to be exchanged; a second verification module (not shown in FIG. 6) configured to, in response to the resource exchange transaction, invoke verification logic in a smart contract deployed in the blockchain to verify whether the target virtual resources satisfy a virtual resource exchange condition; and an exchange module (not shown in FIG. 6) configured to, if the target virtual resources satisfy the virtual resource exchange condition, further invoke virtual resource exchange logic in the smart contract to generate a permitted exchange event corresponding to the target virtual resources, and publish the permitted exchange event to the blockchain to be deposited as a credential, wherein when a payment platform monitors the permitted exchange event deposited on the blockchain as a credential, the payment platform calculates an exchange amount based on an amount of service profits associated with a single piece of virtual resource in the virtual resource pool as deposited as a credential on the blockchain and the amount of the target virtual resources and based on the exchange amount, performs transfer to the exchange account corresponding to the user identifier of the target user.

In one embodiment, the virtual resources include any one of the following: virtual stocks that are associated with a service profit revenue of the service operator; virtual assets that are associated with the service profit revenue of the service operator; virtual options that are associated with the service profit revenue of the service operator; or electronic tokens that are associated with the service profit revenue of the service operator.

In one embodiment, the service operator is a payment platform, or a merchant accessing the payment platform.

The system, apparatus, module, or unit described in the previous embodiments can be implemented by a computer chip or entity, or can be implemented by using a product with a certain function. An example of a device is a computer, and the form of the computer can be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

In a configuration, a computer includes one or more of a processor (CPU), an input/output interface, a network interface, and a memory.

The memory can include a transitory memory, a random access memory (RAM), and/or a non-volatile memory in a computer-readable medium, such as a read-only memory (ROM) or a flash RAM. The memory is an example of a computer-readable medium.

The computer-readable medium includes persistent, non-persistent, removable or non-removable medium, which can store information by any method or technology. Information can be computer-readable instructions, data structures, modules of a program, or other data. Examples of computer storage media include, but are not limited to, a parameter random access memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a compact disc read-only memory (CD-ROM), a digital versatile disc (DVD) or other optical storage, a cassette magnetic tape, magnetic disk storage, a quantum memory, graphene-based storage media, or other magnetic storage devices or any other non-transmission media can be used to store information that can be accessed by computing devices. Based on the definition in the present disclosure, computer-readable media does not include transitory computer-readable media (transitory media), such as modulated data signals and carrier waves.

It is worthwhile to further note that the term "include", "comprise", or their any other variant is intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

Some embodiments of the present disclosure have been described above. Other embodiments are within the scope of the following claims. In some cases, the actions or steps recited in the claims can be performed in a different order than in the embodiments and the desired result can still be achieved. In addition, the processes depicted in the figures may not require the particular order shown or sequential order to achieve the desired results. In some embodiments, multitasking and parallel processing are also possible or can be advantageous.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information; and similarly, second information can also be referred as first information. Depending on the context, the word "if" as used herein can be interpreted as "when" or "upon" or "in response to determining".

The previous descriptions are some embodiments of the present disclosure, and are not intended to limit the present disclosure. Any modifications, equivalent replacements, and improvements made within the spirit and the principle of the present disclosure shall fall within the scope of the claims in the present disclosure.

The invention claimed is:

1. A computer-implemented method for allocating a virtual resource, the method comprising:
receiving, by a node in a blockchain, resource allocation transaction data sent by a client, wherein the resource allocation transaction data comprises a target user identifier of a target user engaging in a service managed by a service operator;
responsive to receiving the resource allocation transaction data, invoking, by the node in the blockchain, verification logic in a smart contract deployed in the blockchain to verify that a service indicator of the target user within a preset service cycle satisfies a virtual resource allocation condition;
responsive to invoking the verification logic in the smart contract, obtaining, by the node in the blockchain, a user list, wherein the user list comprises a list of user identifiers corresponding to service indicators that satisfy the virtual resource allocation condition; and when the user list does not comprise the target user identifier, determining a first amount of virtual resources held in a blockchain account corresponding to the target user identifier on the blockchain and transferring the first amount of the virtual resources held in the blockchain account into a virtual resource pool, or when the user list comprises the target user identifier, invoking virtual resource allocation logic in the smart contract to allocate a second amount of the virtual resources to the target user from the virtual resource pool and transfer the second amount of the virtual resources to the blockchain account corresponding to the target user identifier, wherein the virtual resources are associated with the service operator that manages the service.

2. The method of claim 1, wherein verifying that the service indicator of the target user within the preset service cycle satisfies the virtual resource allocation condition comprises:

searching for the user list, wherein the user list was published to the blockchain as a credential by the service operator; and matching the target user identifier of the target user of the resource allocation transaction data with the user identifiers in the user list, to determine that the service indicator of the target user satisfies the virtual resource allocation condition.

3. The method of claim 1, wherein the service comprises a payment, the service indicator of the target user comprises a number of payment orders, and the virtual resource allocation condition comprises one or more of:

the number of payment orders in the preset service cycle reaching a first preset threshold;

an average number of payment orders across one or more units within the preset service cycle reaching a second preset threshold; or the number of payment orders in a unit within the preset service cycle reaching a third preset threshold.

4. The method of claim 1, wherein a given virtual resource of the virtual resources is prohibited from being transferred between blockchain accounts on the blockchain.

5. The method of claim 1, further comprising:

receiving, by the node in the blockchain, resource exchange transaction data sent by the client, wherein the resource exchange transaction data comprises the target user identifier of the target user and an amount of target virtual resources to be exchanged;

responsive to receiving the resource exchange transaction data, invoking subsequent verification logic in a subsequent smart contract deployed in the blockchain to verify that the target virtual resources satisfy a virtual resource exchange condition;

responsive to the target virtual resources satisfying the virtual resource exchange condition, invoking virtual resource exchange logic in the subsequent smart contract to generate a permitted exchange event corresponding to the target virtual resources; and publishing the permitted exchange event as a first credential to the blockchain, wherein a payment platform monitoring the blockchain calculates an exchange amount based on an amount of service profits associated with a single piece of virtual resource in the virtual resource pool as deposited as a second credential on the blockchain, and based on the amount of the target virtual resources to be exchanged, and wherein the payment platform performs a transfer of the target virtual resources, based on the exchange amount, to an exchange account corresponding to the target user identifier of the target user.

6. The method of claim 1, wherein the virtual resources comprise one or more of:

virtual stocks associated with a service profit revenue of the service operator;

virtual assets associated with the service profit revenue of the service operator;

virtual options associated with the service profit revenue of the service operator; or electronic tokens associated with the service profit revenue of the service operator.

7. The method of claim 1, wherein the service operator is a payment platform, or a merchant accessing the payment platform.

8. A computer-implemented system, comprising:

one or more processors; and one or more computer-readable memories coupled to the one or more processors and having instructions stored thereon that are executable by the one or more processors to perform one or more operations of a node in a blockchain for allocating a virtual resource, wherein the operations comprise:

receiving, by the node in the blockchain, resource allocation transaction data sent by a client, wherein the resource allocation transaction data comprises a target user identifier of a target user engaging in a service managed by a service operator;

responsive to receiving the resource allocation transaction data, invoking, by the node in the blockchain, verification logic in a smart contract deployed in the blockchain to verify that a service indicator of the target user within a preset service cycle satisfies a virtual resource allocation condition;

responsive to invoking the verification logic in the smart contract, obtaining, by the node in the blockchain, a user list, wherein the user list comprises a list of user identifiers corresponding to service indicators that satisfy the virtual resource allocation condition; and when the user list does not comprise the target user identifier, determining a first amount of virtual resources held in a blockchain account corresponding to the target user identifier on the blockchain and transferring the first amount of the virtual resources held in the blockchain account into a virtual resource pool, or when the user list comprises the target user identifier, invoking virtual resource allocation logic in the smart contract to allocate a second amount of the virtual resources to the target user from the virtual resource pool and transfer the second amount of the virtual resources to the blockchain account corresponding to the target user identifier, wherein the virtual resources are associated with the service operator that manages the service.

9. The computer-implemented system of claim 8, wherein verifying that the service indicator of the target user within the preset service cycle satisfies the virtual resource allocation condition comprises:

searching for the user list, wherein the user list was published to the blockchain as a credential by the service operator; and matching the target user identifier of the target user of the resource allocation transaction data with the user identifiers in the user list, to determine that the service indicator of the target user satisfies the virtual resource allocation condition.

10. The computer-implemented system of claim 8, wherein the service comprises a payment, the service indicator of the target user comprises a number of payment orders, and
the virtual resource allocation condition comprises one or more of:
the number of payment orders in the preset service cycle reaching a first preset threshold;
an average number of payment orders across one or more units within the preset service cycle reaching a second preset threshold; or
the number of payment orders in a unit within the preset service cycle reaching a third preset threshold.

11. The computer-implemented system of claim 8, wherein a given virtual resource of the virtual resources is prohibited from being transferred between blockchain accounts on the blockchain.

12. The computer-implemented system of claim 8, wherein the operations further comprise:
receiving, by the node in the blockchain, resource exchange transaction data sent by the client, wherein the resource exchange transaction data comprises the target user identifier of the target user and an amount of target virtual resources to be exchanged;
responsive to receiving the resource exchange transaction data, invoking subsequent verification logic in a subsequent smart contract deployed in the blockchain to verify that the target virtual resources satisfy a virtual resource exchange condition;
responsive to the target virtual resources satisfying the virtual resource exchange condition, invoking virtual resource exchange logic in the subsequent smart contract to generate a permitted exchange event corresponding to the target virtual resources; and
publishing the permitted exchange event as a first credential to the blockchain, wherein a payment platform monitoring the blockchain calculates an exchange amount based on an amount of service profits associated with a single piece of virtual resource in the virtual resource pool as deposited as a second credential on the blockchain, and based on the amount of the target virtual resources to be exchanged, and
wherein the payment platform performs a transfer of the target virtual resources, based on the exchange amount, to an exchange account corresponding to the target user identifier of the target user.

13. The computer-implemented system of claim 8, wherein the virtual resources comprise one or more of:
virtual stocks associated with a service profit revenue of the service operator;
virtual assets associated with the service profit revenue of the service operator;
virtual options associated with the service profit revenue of the service operator; or
electronic tokens associated with the service profit revenue of the service operator.

14. The computer-implemented system of claim 8, wherein the service operator is a payment platform, or a merchant accessing the payment platform.

15. A non-transitory, computer-readable medium storing one or more instructions executable by a computer system to perform operations of a node in a blockchain for allocating a virtual resource, wherein the operations comprise:

receiving, by the node in the blockchain, resource allocation transaction data sent by a client, wherein the resource allocation transaction data comprises a target user identifier of a target user engaging in a service managed by a service operator;
responsive to receiving the resource allocation transaction data, invoking, by the node in the blockchain, verification logic in a smart contract deployed in the blockchain to verify that a service indicator of the target user within a preset service cycle satisfies a virtual resource allocation condition;
responsive to invoking the verification logic in the smart contract, obtaining, by the node in the blockchain, a user list, wherein the user list comprises a list of user identifiers corresponding to service indicators that satisfy the virtual resource allocation condition; and
when the user list does not comprise the target user identifier, determining a first amount of virtual resources held in a blockchain account corresponding to the target user identifier on the blockchain and transferring the first amount of the virtual resources held in the blockchain account into a virtual resource pool, or
when the user list comprises the target user identifier, invoking virtual resource allocation logic in the smart contract to allocate a second amount of the virtual resources to the target user from the virtual resource pool and transfer the second amount of the virtual resources to the blockchain account corresponding to the target user identifier,
wherein the virtual resources are associated with the service operator that manages the service.

16. The non-transitory, computer-readable medium of claim 15, wherein verifying that the service indicator of the target user within the preset service cycle satisfies the virtual resource allocation condition comprises:
searching for the user list, wherein the user list was published to the blockchain as a credential by the service operator; and
matching the target user identifier of the target user of the resource allocation transaction data with the user identifiers in the user list, to determine that the service indicator of the target user satisfies the virtual resource allocation condition.

17. The non-transitory, computer-readable medium of claim 15, wherein the service comprises a payment, the service indicator of the target user comprises a number of payment orders, and
the virtual resource allocation condition comprises one or more of:
the number of payment orders in the preset service cycle reaching a first preset threshold;
an average number of payment orders across one or more units within the preset service cycle reaching a second preset threshold; or
the number of payment orders in a unit within the preset service cycle reaching a third preset threshold.

18. The non-transitory, computer-readable medium of claim 15, wherein a given virtual resource of the virtual resources is prohibited from being transferred between blockchain accounts on the blockchain.

19. The non-transitory, computer-readable medium of claim 15, wherein the operations further comprise:
receiving, by the node in the blockchain, resource exchange transaction data sent by the client, wherein the resource exchange transaction data comprises the target user identifier of the target user and an amount of target virtual resources to be exchanged;

responsive to receiving the resource exchange transaction data, invoking subsequent verification logic in a subsequent smart contract deployed in the blockchain to verify that the target virtual resources satisfy a virtual resource exchange condition;

responsive to the target virtual resources satisfying the virtual resource exchange condition, invoking virtual resource exchange logic in the subsequent smart contract to generate a permitted exchange event corresponding to the target virtual resources; and publishing the permitted exchange event as a first credential to the blockchain, wherein a payment platform monitoring the blockchain calculates an exchange amount based on an amount of service profits associated with a single piece of virtual resource in the virtual resource pool as deposited as a second credential on the blockchain, and based on the amount of the target virtual resources to be exchanged, and wherein the payment platform performs a transfer of the target virtual resources, based on the exchange amount, to an exchange account corresponding to the target user identifier of the target user.

20. The non-transitory, computer-readable medium of claim 15, wherein the service operator is a payment platform, or a merchant accessing the payment platform.

\* \* \* \* \*